United States Patent [19]
Hollmann et al.

[11] Patent Number: 5,835,208
[45] Date of Patent: Nov. 10, 1998

[54] APPARATUS TO MEASURE WEDGE AND CENTERING ERROR IN OPTICAL ELEMENTS

[75] Inventors: Joerg Hollmann, Midland; Gabor Devenyi, Peuetang; Kevin B. Wagner, Victoria Harbour, all of Canada

[73] Assignee: Raytheon Company, Lexington, Mass.

[21] Appl. No.: 863,714

[22] Filed: May 27, 1997

[51] Int. Cl.$^6$ ................................................. G01B 9/00
[52] U.S. Cl. ......................... 356/124; 356/125; 356/127
[58] Field of Search ................................. 356/124, 125, 356/127

[56] References Cited

U.S. PATENT DOCUMENTS

| | | | |
|---|---|---|---|
| 4,601,575 | 7/1986 | Tamaki | 356/124 |
| 4,925,301 | 5/1990 | Rafanelli | 356/124 |

*Primary Examiner*—Frank G. Font
*Assistant Examiner*—Reginald A. Ratliff
*Attorney, Agent, or Firm*—W. C. Schubert; G. H. Lenzen, Jr.

[57] ABSTRACT

The present invention provides a measuring apparatus (10) for centering and determining wedge error of an optical element (12) under test. The measuring apparatus (10) preferably includes a lens holder (16) for supporting the optical element (12) to be tested. The lens holder (16) is rotatably supported on an air bearing (68) having an axis such that the lens holder (16) may be rotated about the axis. A first sensor (18) is located proximate the lens holder (16) for measuring the wedge characteristics of the optical element (12). The first sensor (18) is movable in a horizontal, vertical and rotatable direction such that the first sensor (18) may be positioned to a predetermined distance from the optical element (12) at a preselected angle. A second sensor (20) is located proximate the lens holder (16) for measuring centering characteristics of the optical element (12). The second sensor (20) is movable in a horizontal and vertical direction such that the second sensor (20) may be positioned to a predetermined distance from the optical element (12). A manipulating member (52) coupled to the second sensor (20) is utilized for centering the optical element (12) relative to the lens holder (16). According to the invention, a theoretical sine wave curve is used to center the lens (12) on the lens holder (16) prior to measuring wedge error. Any holder error is removed from the measurement data by introducing a phase shift to the testing sequence.

20 Claims, 5 Drawing Sheets

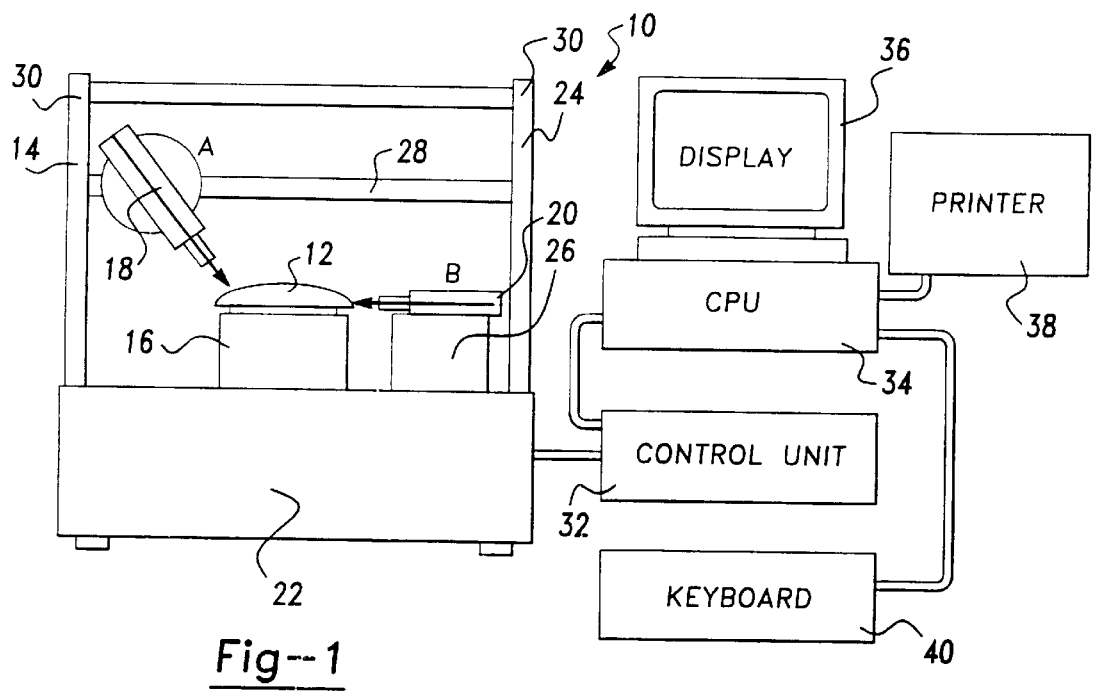
Fig--1
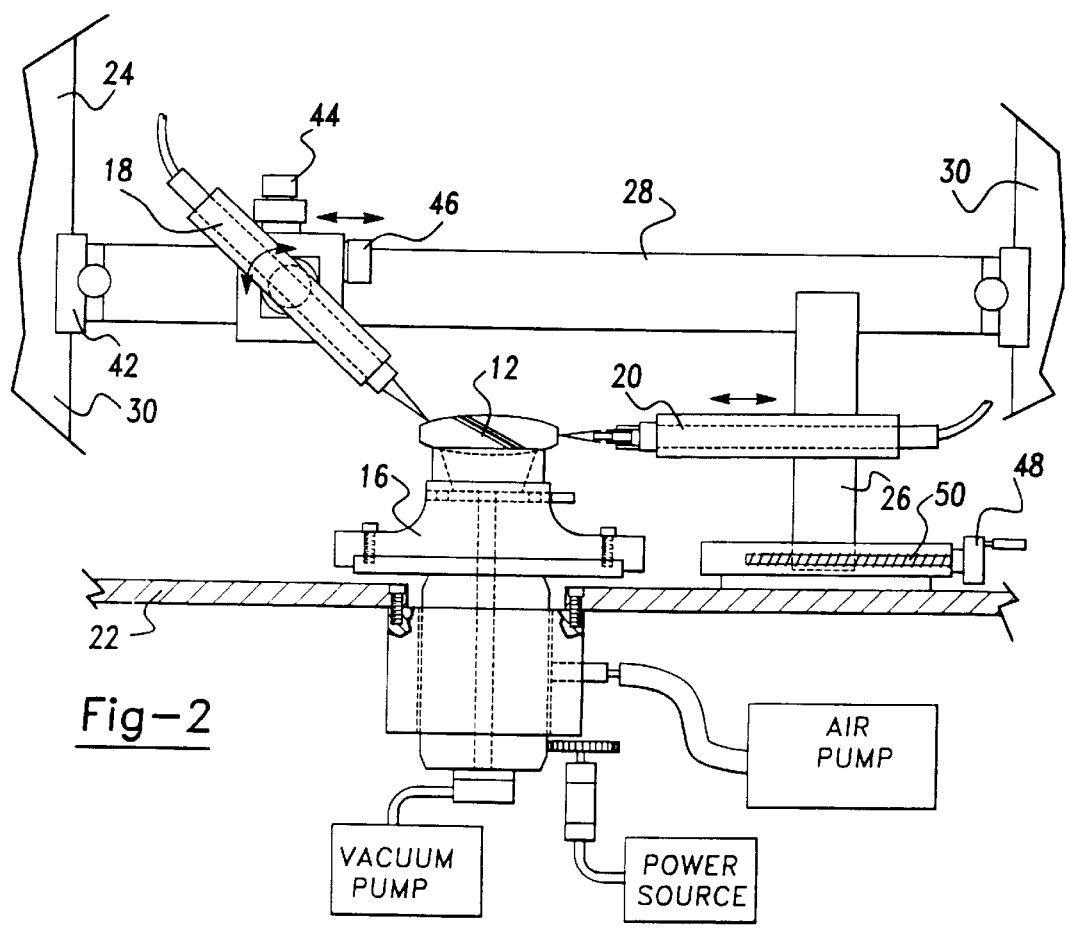
Fig-2

APPARATUS TO MEASURE WEDGE AND CENTERING ERROR IN OPTICAL ELEMENTS

BACKGROUND OF THE INVENTION

1. Field of the Invention

The present invention generally relates to measuring apparatus for optical elements and, more particularly, to a non-contact measuring apparatus for quickly determining wedge and centering errors in optical elements under test.

2. Description of Related Art

Optical elements often require testing to determine optical and mechanical characteristics. For example, it is often necessary to test a lens for mechanical and optical wedge error. One way opticians test for wedge error according to the prior art is by non-contact testing.

To accomplish this, a discrete centering device initially centers the lens on a precision spindle or bearing. An image is then reflected onto the lens which is rotated by the spindle or ball bearing to expose the entire surface to the image. The reflected image is then recaptured and evaluated to determine the wedge characteristics of the lens.

One drawback of this method is that conventional spindles and ball bearings introduce error to the test. For example, runout, tilt and wobble are typical concerns. The accuracy of the test results is often compromised due to the introduced error. Additionally, the discrete centering device adds unwanted complexity to the system.

A second way opticians test for wedge according to the prior art is by contact testing with a micrometer. To accomplish this, the lens is positioned on posts with its outside edge pressed against a V-guide block. The lens is then manually rotated and periodic wedge measurements are made with the micrometer. This method is very sensitive since the V-guide serves as a reference for the micrometer. However, this method raises the potential for scratching or damaging the lens since it rotates against the V-guide and is contacted by the micrometer.

A third way optical wedge error is currently measured is with an auto-collimator. However, auto-collimators can only be used for optics in the visible wave length range. To date, no auto-collimator has been made available for use within the ultraviolet or infrared wave length range. Thus, this method is very limited in its application usefulness.

In view of the drawbacks of currently available measuring systems, it is desirable to provide a measurement apparatus for measuring wedge which minimizes introduced errors and eliminates potential surface damage to the optical element under test. Furthermore, it is desirable to provide a measurement apparatus eliminating the need for a discrete centering device.

SUMMARY OF THE INVENTION

The above and other objects are provided by a measuring apparatus for centering and determining wedge error of an optical element under test. The measuring apparatus preferably includes a lens holder for supporting the optical element to be tested. The lens holder is rotatably supported on an air bearing having an axis such that the lens holder may be rotated about the axis. A first sensor is located proximate the lens holder for measuring the wedge characteristics of the optical element. The first sensor is movable in a horizontal, vertical and rotatable direction such that the first sensor may be positioned to a predetermined distance from the optical element at a preselected angle. A second sensor is located proximate the lens holder for measuring centering characteristics of the optical element. The second sensor is movable in a horizontal and vertical direction such that the second sensor may be positioned to a predetermined distance from the optical element. A manipulating member coupled to the second sensor is utilized for centering the optical element relative to the lens holder. According to the invention, a theoretical sine wave curve is used to center the lens on the lens holder prior to measuring wedge error. Any holder error is removed from the measurement data by introducing a phase shift to the testing sequence.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 1 is a block diagram of a measuring apparatus for centering and measuring wedge error in an optical element under test in accordance with the teachings of the present invention;

FIG. 2 is a more detailed view of the mechanical and optical elements of the measurement apparatus of FIG. 1;

DESCRIPTION OF THE PREFERRED EMBODIMENTS

Figure 3:
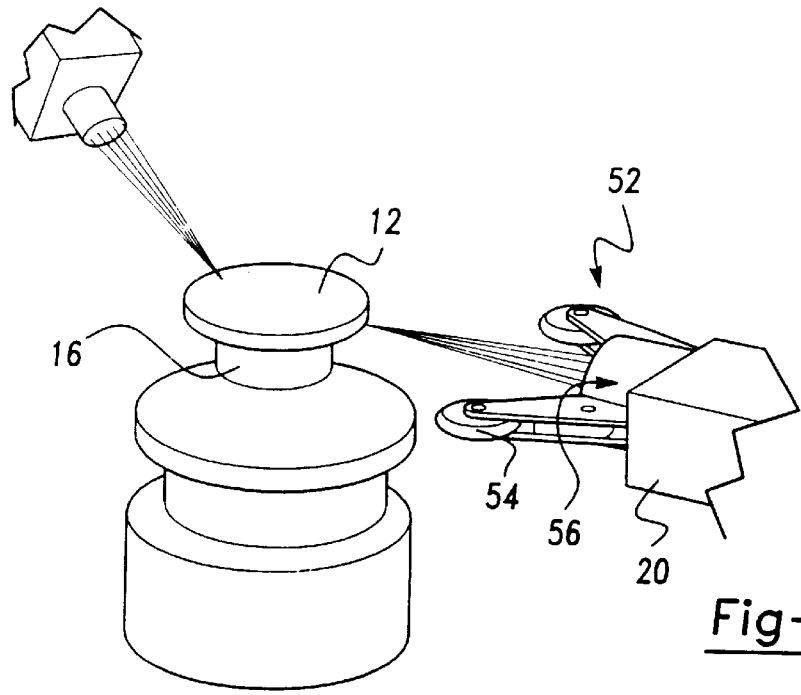
FIG. 3 is a more detailed perspective view of the combination optical sensor/manipulator of FIG. 2.

The present invention is directed towards a measuring apparatus for centering and determining wedge error of an optical element under test. According to the invention, a theoretical sine wave curve is used in conjunction with a combination sensor/manipulator to center a lens on a lens holder prior to measuring wedge error. An air bearing with negligible runout, tilt and wobble supports the lens holder to minimize introduced error during wedge testing. Any holder error is removed from the measurement data by introducing a phase shift to the testing sequence. This is accomplished by rotating the lens 180° and remeasuring wedge error. Damage to the lens surface is prevented since it is not contacted during testing.

Referring now to the drawings, FIG. 1 illustrates an apparatus 10 for centering and subsequently measuring wedge error in an optical element 12 under test. The apparatus 10 includes a support means 14 for supporting elements of the apparatus 10, such as the lens holder 16, optical focus sensor 18 and the combination optical focus sensor and lens manipulator 20 (hereinafter the sensor/manipulator 20). Preferably, the support means 14 includes a table assembly 22 and a frame assembly 24.

A holding means for supporting the optical element 12, such as the lens holder 16, is rotatably secured to the table assembly 22. Preferably, the lens holder 16 is located generally at the center of the table assembly 22 to allow complete accessibility of the optical element 12 to the sensor 18 and sensor/manipulator 20. Furthermore, the lens holder 16 is operable for rotating the optical element 12 relative to the sensor 18 and sensor/manipulator 20. This enables the entire surface area of the optical element 12 to be exposed to at least one of the sensor 18 and the sensor/manipulator 20.

A support member 26 is also secured to the table assembly 22 proximate the lens holder 16 for supporting the sensor/manipulator 20. The sensor/manipulator 20 is movably coupled to the support member 26 such that it is movable in a horizontal direction and in a vertical direction relative to the optical element 12. In this way, the sensor/manipulator 20 may be position at a given distance, e.g., one focal length, from the edge of the optical element 12.

Similarly, the sensor 18 is movably coupled to the frame assembly 24. As can be seen, it is preferable that the sensor 18 is mounted to a cross bar 28 of the frame assembly 24. The cross bar 28 is vertically positionable along a pair of vertically extending support bars 30 of the frame assembly 24. As such, the cross bar 28 may be moved to vertically position the sensor 18 relative to the optical element 12.

The sensor 18 is also movable in a horizontal direction longitudinally along the expanse of the cross bar 28. Additionally, the sensor 18 is rotatable in a clockwise and/or counter-clockwise direction about an axis extending laterally through the sensor 18 and the cross bar 28. In this way, the sensor 18 may be positioned a predetermined distance away from a surface of the optical element 12, e.g., one focal length, and at a pre-selected angle, e.g., perpendicular.

The lens holder 16, sensor 18, and sensor/manipulator 20 electrically communicate with a control unit 32. The control unit 32 serves as an interface for a central processing unit (CPU) 34. As such, the control unit 32 implements the control strategies of the CPU 34 by coordinating the movement of the lens holder 16, sensor 18, and sensor/manipulator 20.

The CPU 34 contains appropriate software for recording data from the sensor 18 and sensor/manipulator 20 and for delivering control data thereto. The CPU 34 is connected to a display 36, printer 38 and keyboard 40 for inputting and outputting data as desired.

Turning now to FIG. 2, the table assembly 22 and frame assembly 24 are shown in greater detail. As can be seen, the cross bar 28 is provided with a pair of Y-clamps 42 for vertically positioning the cross bar 28 along the vertical support bars 30. Additionally, an X-clamp 44 secures the sensor 18 to the cross bar 28. The X-clamp 44 enables the sensor 18 to be positioned at various locations along the cross bar 28 with respect to the lens holder 16. A knob 46 secures the sensor 18 at pre-selected angles after it is rotated about its central axis.

The support member 26 preferably includes a motorized lift operable for raising and lowering the sensor/manipulator 20. A crank 48 adjoining an elongated threaded member 50 is coupled to the sensor/manipulator 20. As such, rotation of the crank 48 causes translational movement of the sensor/manipulator 20 fore and aft relative the lens holder 16.

As best seen in FIG. 3, the sensor/manipulator 20 includes a means 52 for manipulating the optical element 12. Preferably, the manipulating means 52 includes a pair of roller bearings 54 outwardly diverging from an end 56 of the sensor/manipulator 20. In this way, the roller bearings 54 can be used to push the optical element 12 to a proper location atop the lens holder 16 without interfering with the radiation emitted from the sensor/manipulator 20. It should be noted that the roller bearings 54 may be moved relative to the optical element 12 independently of the movement of the sensor/manipulator 20 or may be integrated therewith. The roller bearings 54 may also be biased toward the lens holder 16 such that the initial contact between the sensor/manipulator 20 and the optical element 12 is dampened.

Figure 4:
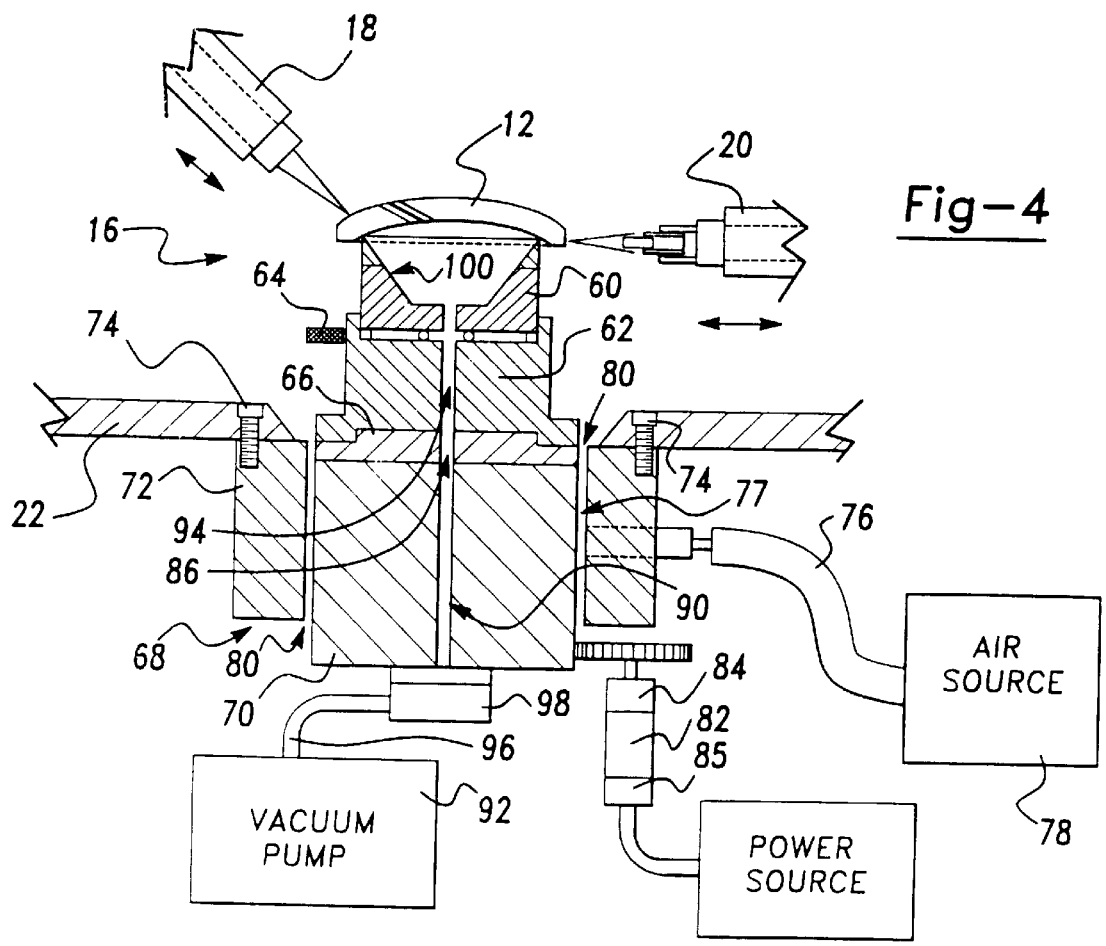
FIG. 4 is a cross-sectional view of the air bearing of the present invention.

Turning now to FIG. 4 a cross sectional view of the lens holder 16 is shown. As can be seen, the lens holder 16 includes a rotatable sleeve bearing 60 operable for rotating the optical element 12 at least 180° relative to the base 62 of the lens holder 16 and, more importantly, the sensor 18 and sensor/manipulator 20. A stopper 64 interconnects the sleeve bearing 60 and the base 62 for positioning the sleeve bearing 60 at predetermined locations relative to the base 62.

It should be noted that although inclusion of the sleeve bearing 60 is preferred, its presence in the present invention is optional. In the case that the sleeve bearing 60 is omitted, the optical element 12 may be manually, i.e., by hand, rotated relative to the sensor 18 and sensor/manipulator 20 by lifting it off the lens holder 16, rotating it, and replacing it on the lens holder 16. As discussed in greater detail below, rotating the optical element 12 introduces a phase shift to the testing sequence which is used to eliminate introduced error from the lens holder 16.

Still referring to FIG. 4, the lens holder 16 is disposed atop an adapter 66. The adapter 66 enables multiple configurations of lens holder 16 to be quickly and easily mounted to the table assembly 22. However, the adapter 66 may be omitted without avoiding the scope of the present invention.

The lens holder 16 is coupled to an air bearing 68 secured to the table assembly 22. More particularly, the adapter 66 is secured to a cylindrical member 70 rotatably disposed within a stationary annular housing 72 of the air bearing 68. Preferably, the housing 72 is suspended below the table assembly 22 by a plurality of threaded members 74. It is also preferred that the rotatable member 70 support the lens holder 16 in spaced relation above the table assembly 22. As such, the lens holder 16 may be rotated without impinging on the table assembly 22.

The air bearing 68 includes an air gap 77 between the rotatable member 70 and the stationary housing 72. An air inlet line 76 fluidly interconnects the air gap 77 and an air source 78. Air is pumped from the air source 78 into the air gap 77 to fluidly support the rotatable member 70 within the housing 72. The air is emitted form the air gap 77 through air outlets 80 in the top and/or bottom of the air bearing 68. The air bearing 68 rotates the optical element 12 via the lens holder 16 with minimal runout, tilt and wobble since the rotatable member 70 rides on a cushion of air.

The rotatable member 70 is operably coupled to a motor 82 for rotary movement. Activation of the motor 82 rotates the rotatable member 70 and lens holder 16 relative to the housing 72, sensor 18 and sensor/manipulator 20. The motor 82 includes a gear box 85 suitable for transferring rotation of the motor 82 to the rotatable member 70. The motor 82 also includes an encoder 85 for tabulating the angle of rotation of the optical element 12 via the lens holder 16 and rotatable member 70. In this way, the optical element 12 can be rotated a predetermined amount relative to the sensor 18 or sensor/manipulator 20.

The lens holder 16 also includes a means 86 for securing the optical element 12 to the lens holder 16. Preferably the securing means 86 includes a vacuum line 90 communicating with the optical element 12 and a vacuum pump 92. Even more preferably, an axial bore 94 extends through the lens holder 16 and air bearing 68. The axial bore 94 is fluidly coupled to a vacuum tube 96 via a coupling 98. The vacuum tube 96 is coupled to the vacuum pump 92 completing the vacuum circuit. According to this configuration, a vacuum is created below the optical element 12 through the lens holder 16 to secure the optical element 12 to the lens holder 16.

To help facilitate centering of the optical element 12 on the lens holder 16, a V-shaped guide 100 is provided in the lens holder 16. As such, the optical element 12 is gravitationally encouraged towards a centered position along the V-shaped guide 100. This reduces the required steps for critically centering the optical element 12 prior to measuring for wedge.

The operation of the present invention will now be described with initial reference to FIG. 2. To measure the wedge error of the optical element 12 correctly, the optical element 12 is first mechanically centered on the lens holder 16. The centering process begins by placing the optical element 12 onto the prealigned V-shaped guide 100 of the lens holder 16. As stated above, this minimizes start-up error.

The sensor/manipulator 20 is then positioned adjacent the edge of the optical element 12. Preferably, the sensor/manipulator 20 is moved such that a focal point of the radiation emitted therefrom coincides with a point along the edge of the optical element 12. The sensor/manipulator 20 then makes four measurements at 90° intervals along the edge of the optical element 12.

This is accomplished by driving the rotatable member 70 with the motor 82 to rotate the lens holder 16. The rotatable member 70 is stopped at each 90° interval based on the information relayed by the encoder 86. At each interval, the distance between the edge of the optical element 12 and the focal point is conveyed to the CPU 34 via the control unit 32.

Since a complete sine function cycle occurs each 360° of rotation of the optical element 12, the four generated measuring points are used to fit a theoretical sine curve to the optical element 12 based on the measured points. The sine curve represents the deviations of the optical element 12 from center. One plotted, the maximum and minimum values on the sine curve are extracted as the mechanical centering error of the optical element 12. The lens holder 16 is then rotated by the motor 82 to align the points along the optical element 12 corresponding to the maximum and minimum values with the sensor/manipulator 20. The sensor/manipulator 20 is then used to push the optical element 12 to center.

Figure 5:
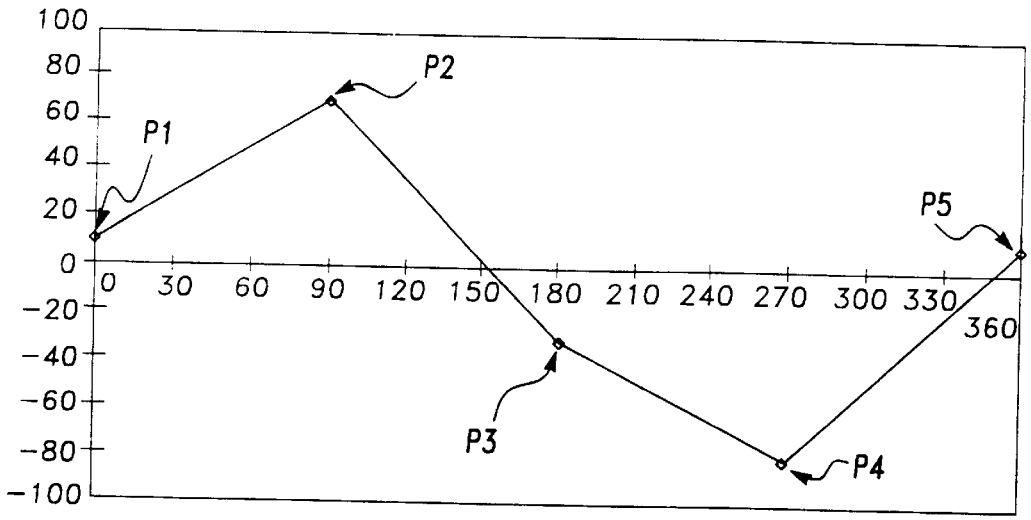
FIG. 5 is a graphic illustration of consecutive periodic centering measurements made by the combination sensor/manipulator of the present invention.

Referring now to FIG. 5, four exemplary measured points P1, P2, P3 and P4 are graphically illustrated. Three of the four points, P1, P2, and P3 are selected for the sine curve fit. It is preferred that the maximum point P2 and the points on either side of the maximum, P1, P3 are selected for this purpose so that the angle of rotation where the peak occurs may be computed. The slopes of the lines interconnecting the points are then calculated using equations (1) and (2).

$$M1=[P2-P1]/90 \quad (1)$$

$$M2=[P2-P3]/90 \quad (2)$$

Figure 6A:
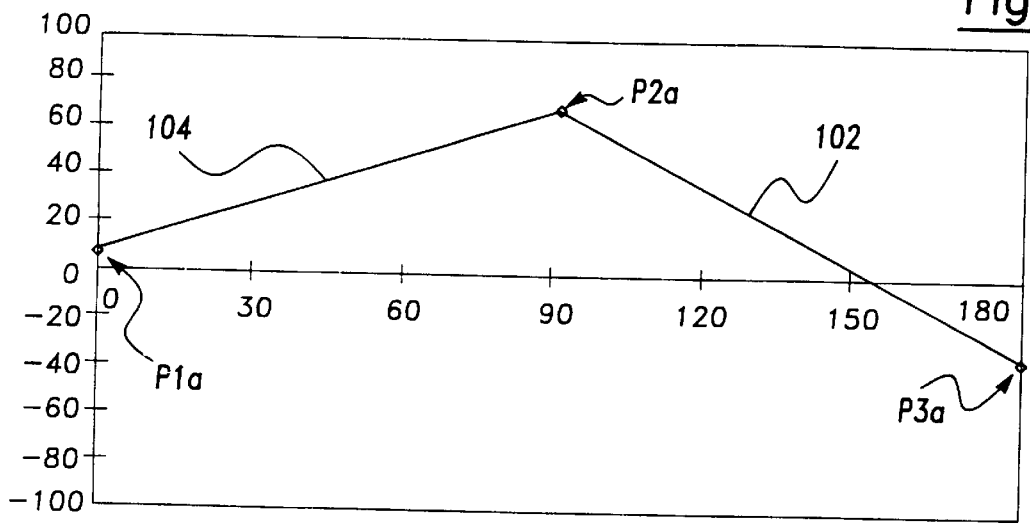
FIGS. 6(a)–6(c) graphically illustrate three scenarios of centering measurements from the combination sensor/manipulator of the present invention.
Figure 6B:
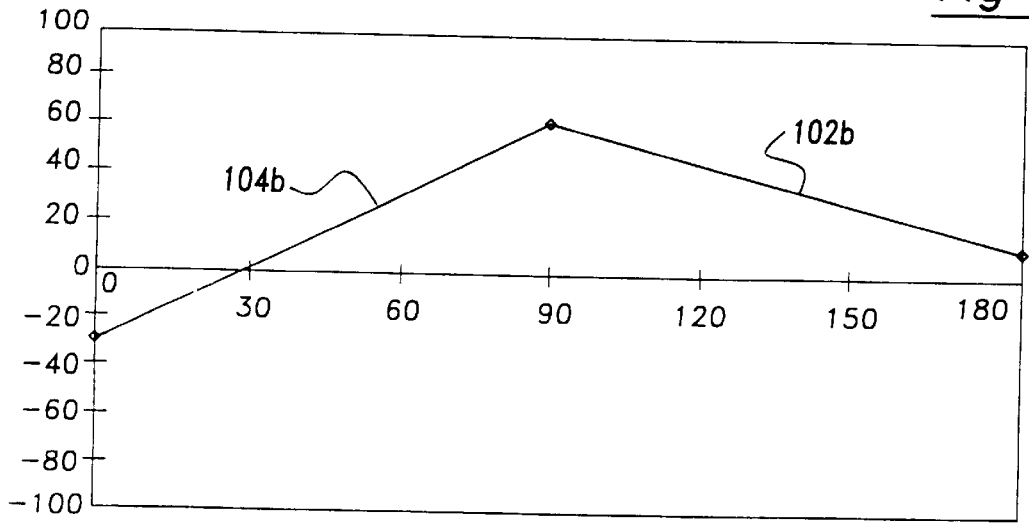
Figure 6C:
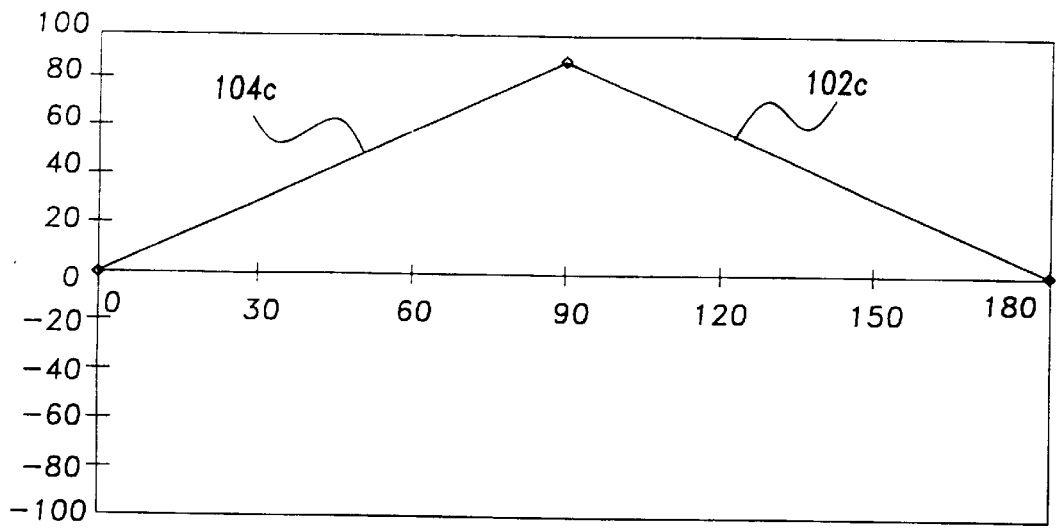

Turning now to FIGS. 6a–6c, three different slope scenarios are depicted which effect the fit of the sine curve. In FIG. 6a, the slope of the line 102 between the measured maximum P2a and point P3a is greater than the slope of the line 104 between the measured maximum P2a and the point P1a. This indicates that the maximum value of the sine curve will be to the left of the measured maximum P2a.

In FIG. 6b the slope of the line 104b is greater than the slope of the line 102b. Therefore, the maximum value of the sine curve will be to the right of the measured maximum P2b. In FIG. 6c, the slope of the line 102c equals the slope of the line 104c. As such, the maximum value of the sine curve will be at the measured maximum P2c.

Figure 7:
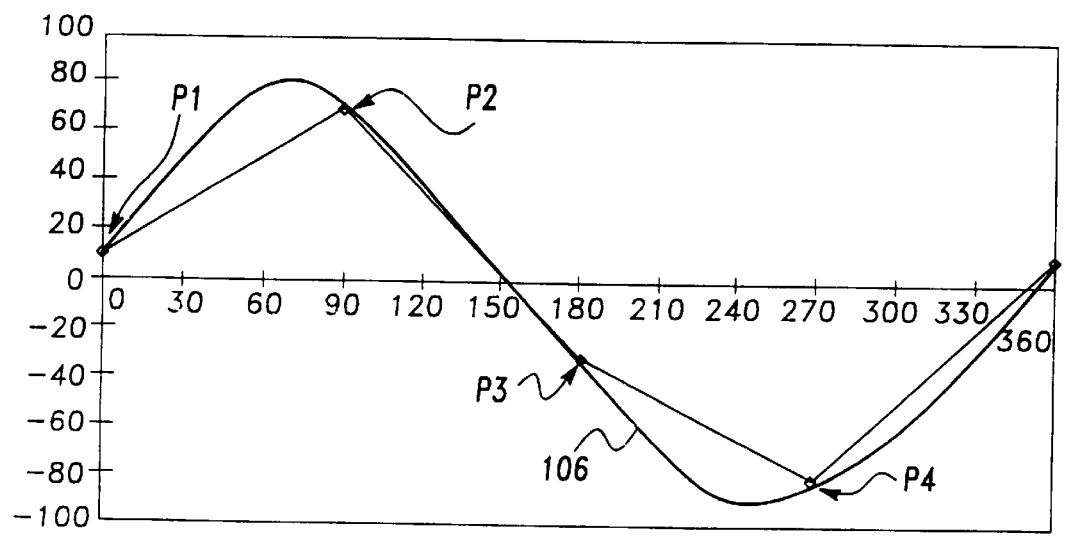
FIG. 7 graphically illustrates a theoretical sine curve fit on the centering measurements of FIG. 5.

Referring now to FIG. 7, a theoretical sine curve 106 is shown fit on the exemplary measured points of FIG. 5. The sine curve 106 illustrates the maximum and minimum values for centering. It should be noted that if all four points can be sine fit, the optical element 12 is round without error. However, large deviations may indicate that the optical element 12 is not round or has other defects such as holes or particles on its edge. Also, the deviation from the sine wave indicates the limit for best centering.

After centering, the optical element 12 is rotated 360° to measure runout and wedge. During rotation, the minimum and maximum measured values vary as the sine of the angle of rotation plus a phase term. According to the present invention, four points 90° apart along the top surface of the optical element 12 are measured with the sensor 18. Using three of these four points the following is computed:

1. a phase term;
2. a peak amplitude based on measured amplitude; and
3. using the fourth point, a determination of roundness.

It should be noted that it is possible to use these four points for the centering sequence described above. However, the edge measurement technique using the sensor/manipulator 20 is preferred.

To determine the above, the slopes are again determined using the equations (1) and (2) above. Next the slopes are normalized to unity using equations (3) and (4).

$$S1=M1/[M1+M2] \quad (3)$$

$$S2=M2/[M1+M2] \quad (4)$$

To compute the phase term, equation (5) is used.

$$\text{Phase}=\text{Tan}^{-1}(S1-S2) \quad (5)$$

The peak of the sine wave is determined by equation (6).

$$\text{Peak Angle}=90-\text{Phase} \quad (6)$$

The complete equation for our fit is:

$$Y=[Pk(\text{Sin}(\text{Angle}+\text{Phase}))]+\text{Offset} \quad (7)$$

Where:

Pk=Peak of the Sine Wave

Angle=Angle in degrees of the Function (0 to 360)

Phase=Phase Angle of the Sine Function

Offset=The DC Component (Y Intercept).

The offset is the Y intercept of the function. For practical reasons the Y intercept is computed by averaging the available points.

$$\text{Offset} = \sum_{1-N} (P1 \ldots Pn)/N \qquad (8)$$

The peak referred to in equation 7 is determined by equation (9).

$$Pk = (Y - \text{Offset})/(\text{Sin } 90 + \text{Phase})) \qquad (9)$$

This yields the maximum runout. The fourth point P4 discarded above may also be compared to this fit function to make a determination of the roundness of the optical element 12.

Figure 8:
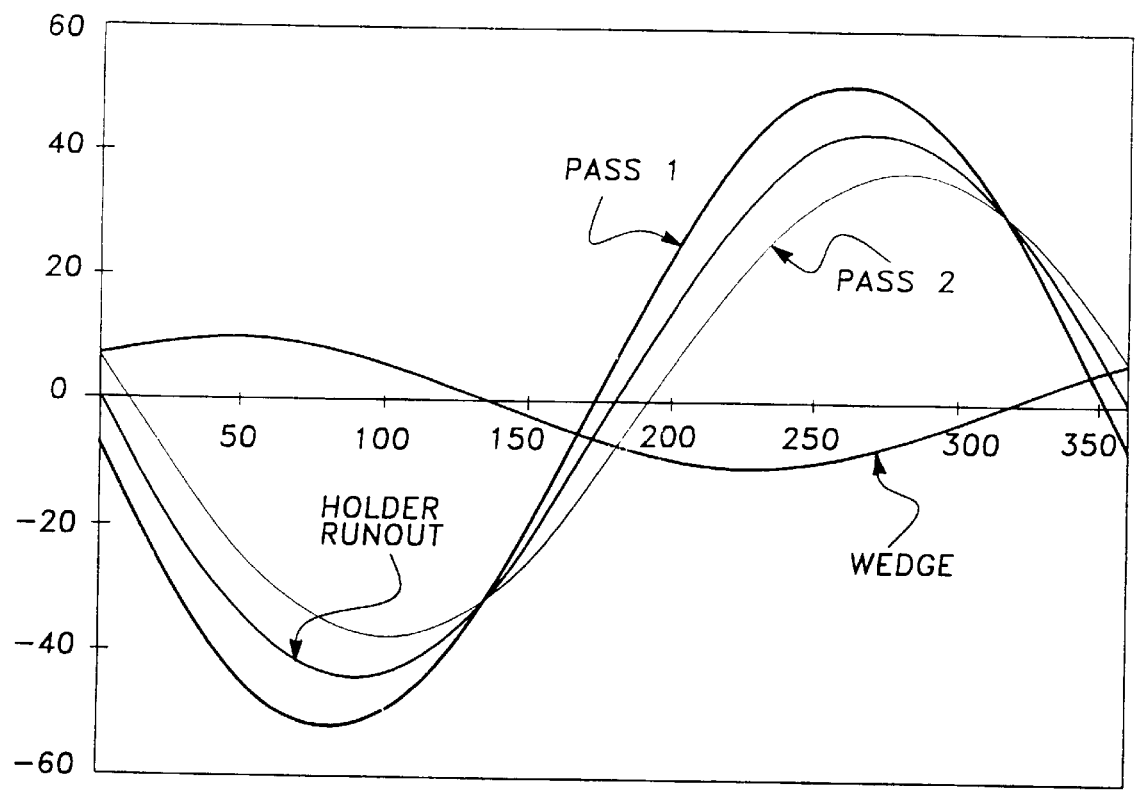
FIG. 8 graphically illustrates first and second theoretical sine curves for two phase shift measurements of the same optical element as well as the corresponding lens holder and wedge error.

Referring now generally to FIG. 8, the optical element is preferably measured in two passes. During the second pass, the optical element 12 is centered on the lens holder 180° rotationally reoriented from the first pass. This enables decoupling of the runout caused by the lens holder 16 from the runout caused by the optical element 12.

To accomplish this, the sleeve bearing 60 and optical element 12 are rotated by 180° relative to the sensor 18 and sensor/manipulator 20. Since this rotation does not introduce any additional error, the errors of the optical element 12 and the lens holder 16 can be separated. The rotation of the lens holder 16 by 180° introduces a phase shift since any wedge error on a rotation system produces a sine wave. The phase shift is used to calculate the error of the lens holder 16 itself, as well as the optical element 12. For repeated measurements of the same type of optical element, the lens holder 16 is measured and its data is stored. For successive measurements, the stored lens holder data is used to calculate the error.

The two passes can be described mathematically as follows.

$$\text{Pass } 1 = H \sin(\theta + \theta H) + L \sin(\theta + \theta L) \qquad (10)$$

$$\text{Pass } 2 = H \sin(\theta + \theta H) + L \sin(\theta + \theta L + 180) \qquad (11)$$

Where

H=Peak Runout of The Holder

θ=Angle of Rotation

θH=Phase Angle of The Holder

L=Peak Runout Of the Lens Under Test

θL=Phase Angle Of The Lens

In order to extract the wedge runout, a base reference of the lens holder 16 runout is required. The optical element 12 contribution to runout is removed by averaging the two passes since the optical element 12 has been turn 180° for the second pass. This is computed as follows.

$$\text{Holder} = (\text{Pass } 1 + \text{Pass } 2)/2 \qquad (12)$$

To determine the wedge of the optical element 12, the difference between the lens holder 16 value and one of the passes is calculated:

$$\text{Lens Wedge} = \text{Pass } 1 - \text{Holder} \qquad (13)$$

Thus, the present invention is operable for initially centering an optical element to be tested and for subsequently measuring wedge. After the initial setup, the centering and wedge determinations are automatic. The present invention enables an optician to center and measure an optical element quickly and accurately without damaging the surface of the optical element to be tested.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An apparatus for centering and measuring the wedge of an optical element to be tested, said apparatus comprising:

a lens holder for supporting said optical element;

an air bearing having an axis, said air bearing rotatably supporting said lens holder such that said lens holder is rotatable about said axis;

a first sensor proximate said lens holder for measuring wedge characteristics of said optical element, said first sensor being movable in a horizontal, vertical and rotatable direction such that said first sensor is positionable to a predetermined distance from said optical element at a preselected angle;

a second sensor proximate said lens holder for measuring centering characteristics of said optical element, said second sensor being movable in a horizontal and vertical direction such that said second sensor is positionable to a predetermined distance from said optical element;

a manipulating member coupled to said second sensor for centering said optical element relative to said lens holder; and a control unit electrically communicating with said first and second sensors and said air bearing, said control unit receiving wedge and centering information from said first and second sensors and coordinating movement of said first and second sensors and said air bearing according to said wedge and centering information.

2. The apparatus of claim 1 further comprising:

a table assembly;

a support member secured to said table assembly, said support member supporting said second sensor;

a pair of support bars vertically extending from said table assembly;

a cross bar extending between said support bars, said cross bar being vertically positionable along said support bars, said cross bar supporting said first sensor.

3. The apparatus of claim 1 wherein said control unit further comprises:

a computer communicating with said first and second sensors for determining centering and wedge error of said optical element.

4. The apparatus of claim 3 wherein said computer further comprises a central processing unit intercoupling a display, a printer and a keyboard for inputting and outputting data as desired.

5. The apparatus of claim 1 wherein said lens holder further comprises:

a base coupled to said air bearing; and a sleeve rotatably supported on said base, said sleeve being rotatable about said axis at least 180°.

6. The apparatus of claim 5 wherein said lens holder further comprises a stopper member for securing said sleeve at a predetermined location relative to said base.

7. The apparatus of claim 1 further comprising:

a motor operably coupled to said air bearing for rotating said lens holder about said axis a predetermined amount.

8. The apparatus of claim 7 wherein said motor further comprises:

a gear box interconnecting said motor and said rotatable member; and an encoder for tabulating the position of said optical element via said lens holder and said rotatable member.

9. The apparatus of claim 1 wherein said air bearing further comprises:

a stationary housing; and a rotatable member rotatably supported on a cushion of air in said stationary housing, said rotatable member being coupled to said lens holder.

10. The apparatus of claim 9 wherein said air bearing further comprises:

an air gap defined between said stationary housing and said rotatable member;

an air inlet formed in said stationary housing communicating with said air gap; and an air pump communicating with said air inlet via an air line for supplying said cushion of air.

11. The apparatus of claim 1 wherein said manipulating member further comprises a pair of roller bearings extending from an end of said second sensor.

12. The apparatus of claim 1 wherein said lens holder further comprises a V-guide lens support surface for holding said optical element.

13. The apparatus of claim 1 further comprising:

a vacuum line fluidly communicating with said lens holder for holding said optical element thereon.

14. The apparatus of claim 13 wherein said vacuum line further comprises:

an axial bore formed in said lens holder and said air bearing;

a vacuum tube communicating with said axial bore; and a vacuum pump communicating with said vacuum tube.

15. A method of centering an optical element for wedge testing comprising the steps of:

securing said optical element to a lens holder;

securing said lens holder to a rotatable member supported on a cushion of air within a stationary housing such that said lens holder is rotatable about an axis;

rotating said optical element 360° about said axis via said rotatable member;

periodically measuring a distance between a point along an edge of said optical element and a focal point of radiation emitted from a first sensor located proximate said optical element to obtain a plurality of distances between a plurality of points along said edge and said focal point;

determining a point along said edge located a maximum distance from said focal point and a point located a minimum distance from said focal point; and moving said optical element relative to said lens holder with said sensor a given amount based on said maximum and minimum distances such that said optical element is centered on said lens holder.

16. The method of claim 15 wherein said step of determining said maximum and minimum distances further comprises:

selecting a maximum measured distance from said plurality of distances;

fitting a sine curve to said distances based on the slopes of a line between said maximum measured distance and an immediately preceding measured distance, and a second line between said maximum measured distance and an immediately subsequent measured distance; and selecting a maximum and minimum value of said sine curve as said maximum and said minimum distances.

17. The method of claim 15 further comprising:

providing a motor operably coupled to said rotatable member for rotating said optical element a predetermined amount via said lens holder.

18. The method of claim 15 further comprising:

securing said optical element to said lens holder via a vacuum line communicating with a vacuum pump through said lens holder.

19. The method of claim 15 further comprising:

centering said optical element relative said lens holder with a manipulating member extending from said first sensor.

20. A method for determining the wedge of an optical element to be tested comprising the steps of:

securing said optical element to a lens holder;

securing said lens holder to a rotatable member supported on a cushion of air within a stationary housing such that said lens holder is rotatable about an axis;

rotating said optical element 360° about said axis via said rotatable member;

periodically measuring a distance between a point along a top surface of said optical element and a focal point of radiation emitted from a sensor located proximate said optical element to obtain a plurality of distances between a plurality of points along said top surface and said focal point;

fitting a sine wave to said plurality of distances to determine a first wedge value;

rotating said optical element 180° relative to said lens holder;

repeating said rotating, measuring and fitting steps to obtain a second wedge value;

determining holder error by averaging said first and second wedge values; and determining said wedge by extracting said holder error from one of said first and second wedge values.

* * * * *